April 14, 1959 D. M. KNOX 2,881,544
PICTURE SUPPORTING MEANS
Filed July 18, 1957 3 Sheets-Sheet 2
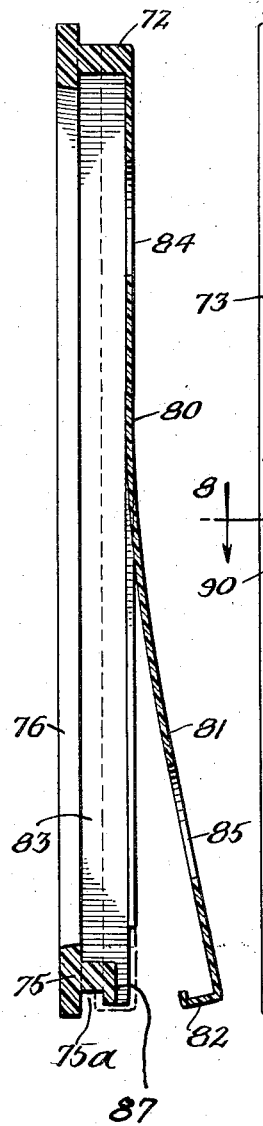
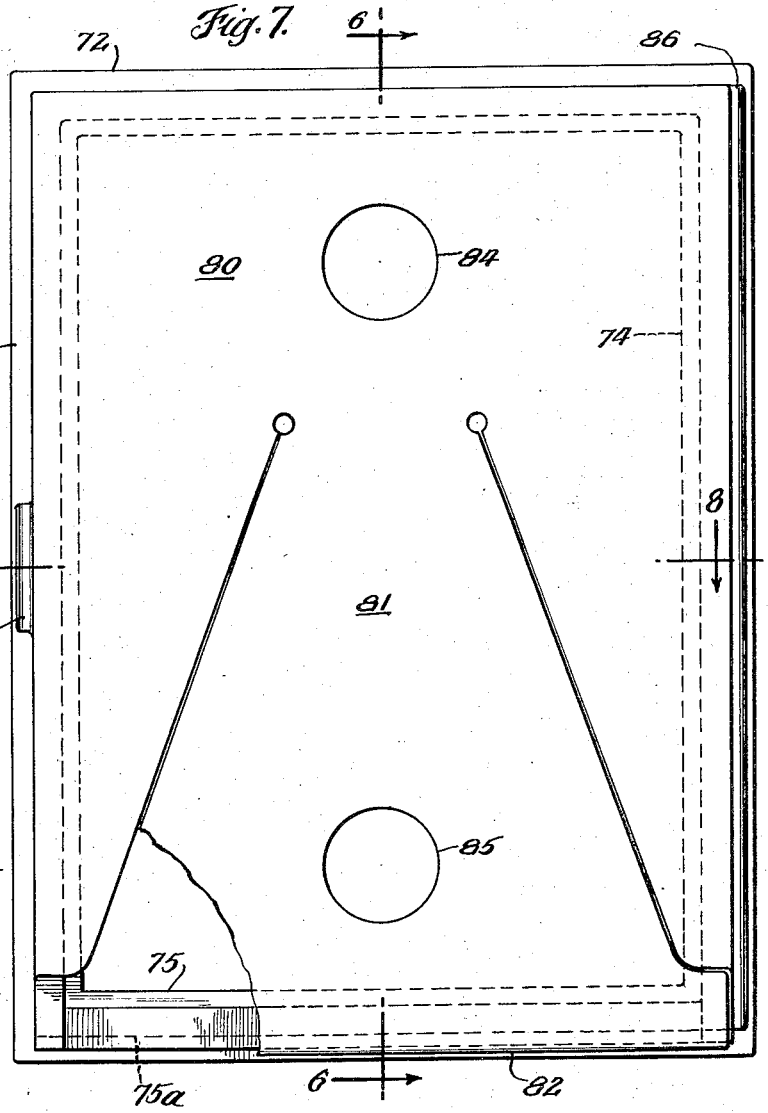
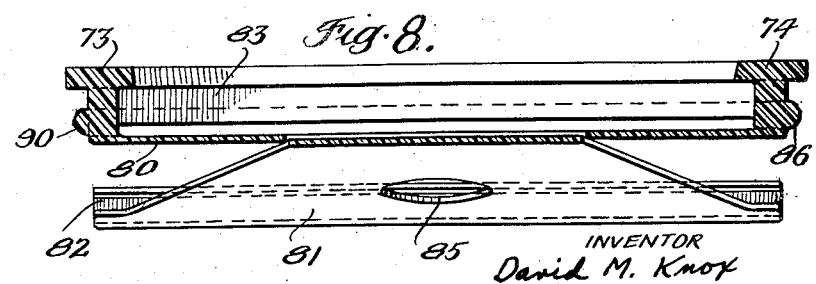
INVENTOR
David M. Knox
by: Synnestvedt & Lechner
ATTORNEYS April 14, 1959  D. M. KNOX  2,881,544
PICTURE SUPPORTING MEANS Filed July 18, 1957  3 Sheets-Sheet 3

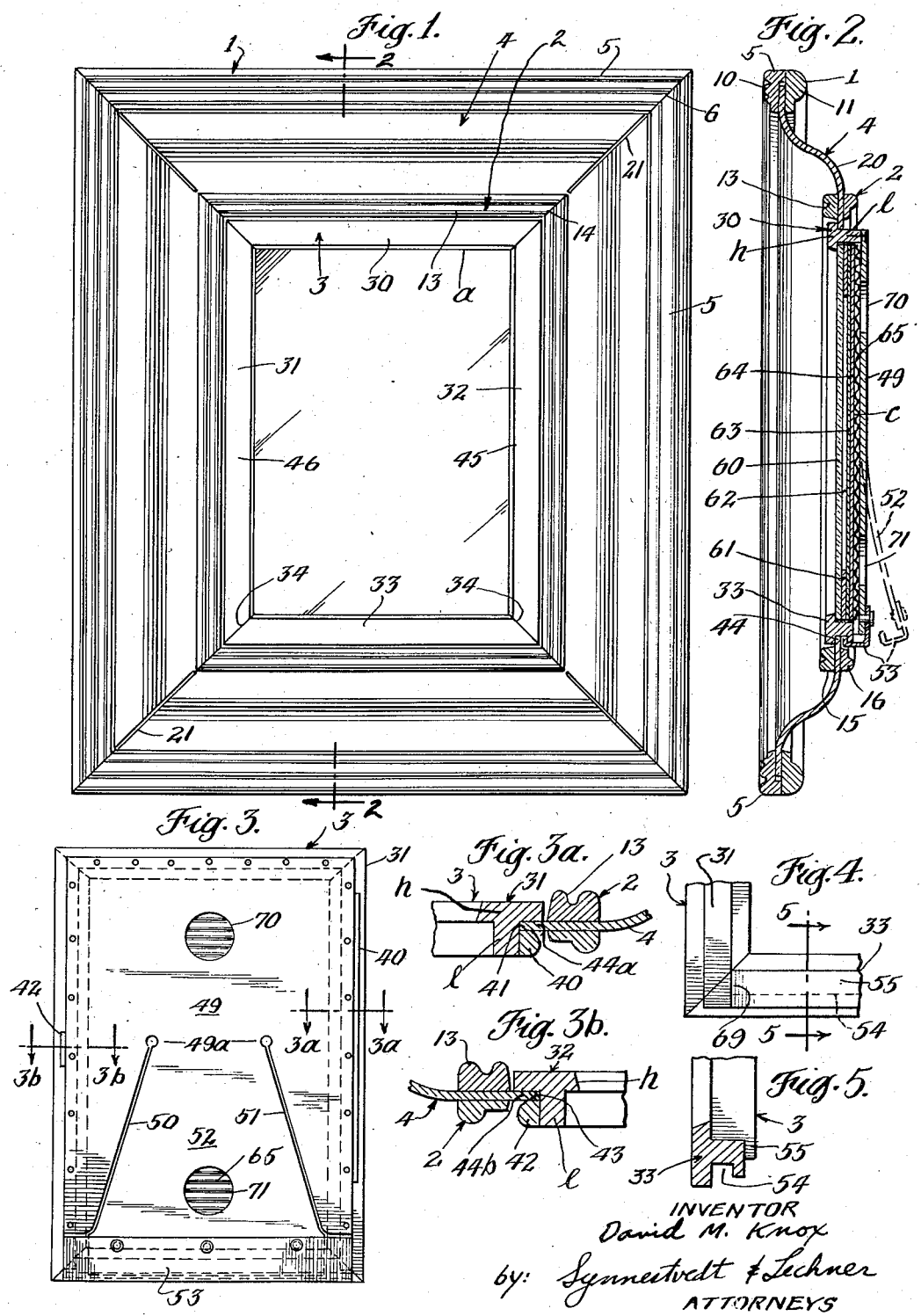

INVENTOR
David M. Knox
BY
Synnestvedt + Lechner
ATTORNEYS

# United States Patent Office 2,881,544
Patented Apr. 14, 1959

2,881,544

PICTURE SUPPORTING MEANS

David M. Knox, New York, N.Y.

Application July 18, 1957, Serial No. 672,707

5 Claims. (Cl. 40—156)

This invention relates to devices for supporting pictures or the like and in particular relates to a novel picture holder for use as an independent picture or mirror supporting device or for use in an ensemble type display.

In one aspect the invention contemplates a dust-proof holder in which a picture may be mounted, removed and/or adjusted in the holder without the use of any accessory backing parts or fastening means.

In another aspect the invention contemplates a holder having a chamber arranged so that a picture can be inserted or withdrawn therefrom, the chamber being formed with a back member having a plurality of apertures by means of which the picture is manually adjustable while disposed in the chamber.

In still another aspect the invention contemplates a novel picture holder which can be used as an independent means for supporting a picture, for example, hung on a wall or mounted on a table, or alternatively, to be used in an ensemble including artistically decorated surrounding framing.

In still another aspect the invention contemplates a dust-proof picture holder having a chamber for the carrying of a picture, the chamber being formed in part by a resilient flap adapted to open and close a recess, the elements being cooperatively arranged whereby the ensemble can be manufactured as a unitary item, for example, as from plastic.

In still another aspect the invention contemplates a picture holder having a picture receiving chamber provided with means for the insertion or withdrawal of a picture including a member which is operative to open and close the chamber, and while in a closed position, exerts a pressure on the picture for retaining the same in the chamber.

A preferred form of the invention is disclosed in the specification to follow taken in conjunction with the drawings wherein:

Figure 1 is a front view of an ensemble type picture display including a picture holder of the invention disposed centrally thereof and interconnected thereto by a deformable member;

Figure 2 is a cross-section on the line 2—2 of Figure 1;

Figure 3 is a rear view of the picture holder of Figure 1;

Figure 3a is a fragmentary view taken along the line 3a—3a of Figure 3 and including portions of the inner frame and deformable section;

Figure 3b is a fragmentary view taken along the line 3b—3b of Figure 3 and including portions of the inner frame and deformable section;

Figure 4 is an enlarged fragmentary view of a corner of the picture holder of Figure 3;

Figure 5 is a fragmentary cross-section on the line 5—5 of Figure 4;

Figure 6 is a vertical section on the line 6—6 of Figure 7;

Figure 7 is a rear view of the picture holder of Figure 6 illustrating a picture holder which has been formed as a unitary object as from plastic;

Figure 8 is a plan section taken on the line 8—8 of Figure 7;

Figure 10:
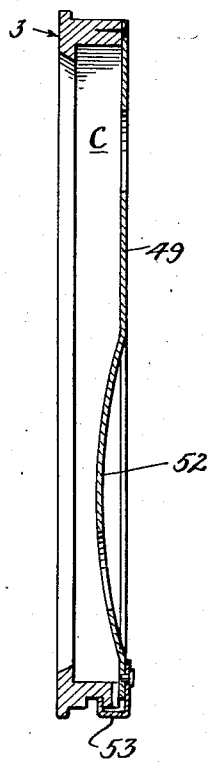
Figure 10 is a view taken along the lines 10—10 of Figure 9.

The details of construction of a preferred form of the invention will be explained following.

In Figure 1 a composite picture ensemble includes framing comprising an outer frame 1, an inner frame 2, together with a removable picture holder 3 and a deformable section 4 interconnecting the inner and outer frames. This general structure is shown in my copending application 672,760 entitled "Ensemble for Pictures and the Like" filed July 18, 1957. The outer frame may comprise molding members 5 which in cross-section are counterparts of one another and joined together by mitered joints such as indicated at 6. The molding members may be of one piece or, alternatively, may be constructed of two pieces 10 and 11 as indicated in Figure 2 which are joined together by any suitable means. The inner frame may comprise molding members such as indicated at 13 which in cross-section are also counterparts of each other and joined at a mitered joint such as indicated at 14. The molding members may be of unitary construction or, alternatively, may be comprised of two pieces such as indicated at 15 and 16 in Figure 2.

The deformable section 4 which interconnects the outer frame 1 and inner frame 2 is made from any desirable deformable material such as polyethylene plastic.

The deformable section 4 is preferably constructed in accordance with the techniques outlined in my prior Patent 2,623,316 so that in cross-section the deformable member is somewhat S-shaped as indicated at 20. If not S-shaped, the deformable member should be contoured so as to provide for the inner and outer frames to be movable toward and away from one another, i.e., that the plane of one may be moved relative to the plane of the other. The slits which appear at the corners of the section, as indicated at 21, may be covered with a thin strip of flexible tape or, alternatively, desirably shaped holes can be placed in the section 4 adjacent the slits to provide a decorative effect.

In connection with the molding members making up the inner and outer frames, it is pointed out that the face surfaces thereof may be different contours; for example, from an inspection of Figure 2 it will be apparent that the face surfaces of the molding members 10 are respectively different in contour than the surfaces for the molding members 11. Additionally, the opposite surfaces of the deformable section 4 may be differently decorated so as to artistically correspond to the contouring provided on the molding members. Thus when the holder is reversed or inverted in the framing, different viewing effects are provided.

In connection with the removing of the holder from the frame, an arrangement such as shown in my copending application or in my Patent 2,735,205 may be used. In the embodiment of the holder shown herein, the detaching arrangement shown in my copending application is used. The details of construction of the holder will next be described.

In Figures 1, 2 and 3 it will be seen that the holder includes a frame comprising upper molding member 30, side molding members 31 and 32 and bottom molding member 33, which are joined together at mitered joints such as indicated at 34. The members 30, 31 and 32 in cross-section are substantially counterparts of one another such as represented by the molding member 30 in Figure 2. The cross-section of molding member 33 is somewhat different from the others and this difference will be explained later. As will be apparent, the molding members are arranged to form an aperture *a* through which the picture in the holder is viewed.

With particular reference to Figure 2, it will be noted that the cross-section of each molding member is generally T-shaped having a head *h* and a leg *l*. As best seen in Figures 3 and 3*a*, the molding member 31 has attached to the leg *l* a strip 40 running substantially throughout the length of the member and forming a groove 41. As seen in Figures 3 and 3*b*, the member 32 has a strip 42 attached to the leg *l* to form a groove 43. The length of the strip 42 is such that the groove 43 is shorter than the groove 41. The significance of the difference in length will be explained later.

As indicated, the intermediate deformable member 4 extends inwardly beyond the inner perimeter of the molding assembly 2. This extension forms a tongue as indicated at 44 (Figure 2) which in the embodiment disclosed extends completely around the aperture *a*. The portions of the tongue 44 adjacent the molding members 31 and 32 extend into the grooves 41 and 43 as indicated at 44*a* and 44*b*.

As the holder is mounted in the inner frame 2, the same is adjusted so that the head portions *h* of the molding members comprising the holder are in engagement with the tongue as is indicated in Figures 3*a* and 3*b*. Also, it is preferable that the dimensions of the tongue and the dimensions of the molding members comprising the holder be arranged so that the inner edge of the tongue is in substantial engagement with the leg portions 1. This engagement serves to secure the holder firmly in place. As mentioned above, the tongue in the embodiment shown extends completely around the aperture *a*. It will be apparent, however, that only two tongues need be provided, for example, a tongue extending into the slot 41 and a tongue extending into the slot 43.

When it is desired to remove the holder, the ensemble (as in the position of Figure 1) may be grasped in both hands with the thumbs on the inner frame, for example, at the points indicated by 45 and 46, and the remaining fingers extending around in back of the framing. The forefinger of the right hand then is used to push on the holder, for example, at the point opposite point 45 so that the right-hand side moves outwardly or pivots about the left-hand side. This action is explained as follows. Since force is exerted on the right-hand side, the short strip 42 can easily move past the tongue 44*b* while the left-hand side is restrained by the action between the long strip 40 and the groove 41. As indicated, the strips may be contoured to facilitate the movement and pivoting actions. When the right-hand side of the holder has pivoted a short distance away from the framing, it then may be grasped in the right hand and removed completely.

When it is desired to insert the holder, the reverse procedure takes place. In other words, the holder is placed in the framing so that the tongue fits into the groove 41 and then the other side is pressed so as to slide the strip 42 past the tongue.

It will be apparent from the above that the tongue and groove arrangement above described makes an expedient and convenient means for not only securing the holder and the framing in a firm relationship, but also provides that the holder can be quickly attached and detached in an expeditious manner.

As mentioned heretofore, the invention contemplates that the holder be used not only in an ensemble as above described, but as an independent means for securing a picture. For example, the holder may be hung on a wall or the like by the use of the usual brad and wire arrangements or mounted on a desk or table top. In such instances, of course, the strips 40 and 42 need not form a part of the structure.

The manner in which a picture is adapted to be mounted in the holder and certain other novel features thereof will be mentioned in connection with further details of construction following.

As indicated in Figures 2 and 3, the molding members comprising the holder have attached thereto a backing plate 49 which preferably is formed from resilient metal or from plastic such as polyethylene. The plate is slit as indicated at 50 and 51 to form a roughly triangular-shaped flap member 52. On the bottom or base of the flap 52 is secured an L-shaped catch 53. With the flap and back made of resilient material, the area of interconnection at 49*a* is flexible and therefore provides for the flap to be movable (in the sense of being pivotable or swingable about the portion 49*a*) from and to the full line and dotted positions shown in Figure 2. When in the position shown by the full lines, the catch 53 engages (see Figure 5) in the groove 54 provided in the member 33. As seen in Figures 4 and 5, the member 33 is formed so as to provide a recess 55 which will be covered when the catch 53 is in the full line position. As indicated in Figure 2, the backing plate 49 is spaced from portions *h* and this spacing, together with the leg portions *l*, forms a chamber *c*. From an inspection of Figures 2 and 4, it will be seen that the recess 55 forms an entrance and exit for the chamber.

The chamber *c* is adapted to hold the picture together with the glass, mat, etc., or other supporting material associated therewith, so that the same can be easily inserted or withdrawn and, while in the chamber, to be movable or adjustable for proper orientation of the picture with respect to the framing. The manner in which this is done will next be explained.

In Figure 2, it will be seen that with the flap 52 in the outward position a piece of glass can be inserted through the recess and space provided by the flap position and pushed into the holder until it occupies the position as indicated by the numeral 60. Then a mat 61 having a rectangular opening 62 is inserted and moved up against the glass into the position shown. The mat forms a border for the picture and may be colored, uncolored or decorated in a manner to artistically cooperate with the picture. Next the picture 63 is inserted and moved up against the mat. Then a piece of cardboard 64 is inserted and moved up against the back of the picture as shown. Lastly, a piece of corrugated paper 65 is moved through the space and positioned against the cardboard. The flap 52 is then moved to close the chamber. As indicated in Figure 2, the outside dimensions of the picture, mat, cardboard and corrugated paper may be made somewhat smaller than the inside dimensions of the chamber so as to provide for some lateral and vertical movement.

It will be noted that the back 49 has a pair of apertures 70 and 71 which are large enough to accommodate any finger of the hand. By contacting the corrugated paper through the apertures, the above supporting material may be moved slightly in the holder so as to desirably adjust the picture with respect to the frame. The assembly will remain in adjusted position for reasons explained following.

Figure 9:
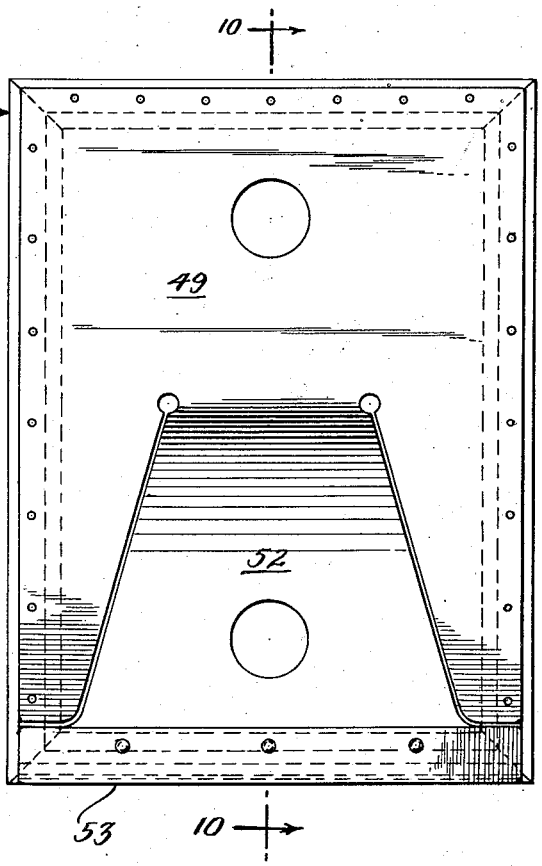
Figure 9 is a rear view of the picture holder of Figure 1 with the chamber being empty.

From an inspection of Figure 3 it will be noted that the flap 52 is shaped generally triangularly. The flap is formed so that in the open position it takes a generally arcuate or curved shape as indicated by the dotted lines in Figure 2. Thus, when the flap is moved to the closed position, a portion will tend to move into the chamber and a light pressure will be exerted on the material in the chamber to hold the same firm against the glass. The pressure exerted is great enough to hold the picture in its adjusted position. Also, when the flap is in closure position and the chamber *c* is empty, i.e., does not have a picture and its supporting material therein, the curved shape of the flap causes a portion thereof to move into the chamber as illustrated in Figures 9 and 10. For purposes of illustration, the projection of the flap into the chamber is somewhat exaggerated.

In connection with the catch mechanism 53, the following should be noted. Inasmuch as the flap 52 is made of resilient material and takes an arcuate shape in its open position, the flap in its closure position will tend to urge the flap 52 outwardly so that the catch is firmly engaged with the outer side of the groove 54. The flap and catch, therefore, are firmly held in closure position.

As mentioned heretofore, one of the features of the holder is that the same is substantially dust proof. This is brought about as follows. The molding members are formed so that there will be very little, if any, spacing in the mitered joints 34 and the glass is held sufficiently tightly against the heads *h* so as not to present an open crack. From an inspection of Figure 2 it will be observed that the catch 53 completely covers the recess 55. The ends of the recess are closed off due to the lower extending portions of the vertical molding members as indicated by numeral 69 (see Figure 4) for the molding member 31. The back member 49, of course, is attached to the molding members 30, etc., so as to make a tight joint. While the corrugated paper is partially exposed due to the apertures 70 and 71, the fit is very close so that there is little chance of dust entering. The slits 50 and 51 which form the flap 52 are for the most part spaced substantially inwardly from the edges of the holder and this provides ample margin for keeping dust out of the chamber.

It will be noted that the holder described heretofore is constructed of several different components, all of which are fastened together to make a composite structure. The nature of the holder is such that it may, however, be made as a unitary piece, for example, cast or molded from plastic. Such a holder is shown in Figures 6, 7 and 8 wherein the molding members designated by the numerals 72, 73, 74 and 75 are arranged to form an aperature 76 together with a back member 80 having a flap 81 provided with a catch 82. The molding members and the back are arranged to form a chamber 83 for accepting the glass, picture, etc. The back is provided with adjusting apertures 84 and 85. Side molding members 73 and 74 are provided with strips 86 and 90 which form a means for securing the holder in a frame. A recess 87 is provided on the lower molding member 75.

From an inspection of Figure 6 it will be noted that the flap 81 in open position assumes a curved shape, and when the flap is in the down position it acts in a manner described above to hold the picture firmly in place.

As to the securing of the catch and flap in down position, two arrangements are preferred, for example, by arranging the catch 82 and groove 75*a* similarly to the catch 53 and groove 54, or alternatively, the length of the flap and the catch and groove are designed so that when the catch is in the groove it is somewhat distorted, the effect of which is to hold the flap firmly in place.

In the holders described above the recess in the lower molding members may be omitted, and if this is done it is preferable that the flap in open position provide substantial access space and therefore the slits in the backing member can be arranged as disclosed in my copending application 672,779 entitled "Holder for Pictures," filed on July 18, 1957.

I claim:

1. For a picture or the like, a holder comprising: a frame formed with a chamber for holding a picture; a back member connected with said frame and forming part of said chamber; and a resilient flap connected to the back member and movable to provide closure means for the chamber, the flap, when in position not to close said chamber, having a curved shape.

2. For a picture or the like, a holder comprising: a frame formed with a chamber for holding a picture assembly; a recess formed in said frame providing entry and exit means for the picture to and from the chamber; a back member connected with said frame and forming part of said chamber; and a flap connected to the back member and positionable to provide closure means for the chamber, the flap being curved so as to tend to extend into said chamber when the flap is in position to close the recess for the purpose of exerting a holding pressure on a picture assembly in the chamber.

3. A holder for a picture or the like including: a frame formed with a chamber for supporting a picture; a piece of glass forming part of said chamber and providing a viewing aperture to said chamber; supporting material in said chamber adapted to hold said picture by interengagement with said glass; a backing member on said frame forming part of said chamber; and a resilient flap connected with said backing member providing a closure means for said chamber, the flap being curved so that when in position to close said chamber it engages said supporting material and exerts a pressure thereon to hold the picture.

4. For a picture or the like, a holder comprising: a frame; a piece of glass on said frame; a backing member on said frame, the frame, the glass and the backing member forming a chamber for supporting a picture assembly and the glass providing a viewing aperture for said chamber; and a flap connected to the backing member and movable to a position wherein said chamber is closed and movable to a position wherein said chamber is open, the flap being curved so that when in position to close said chamber a portion thereof can engage a picture assembly in the chamber and exert a pressure thereon whereby to hold the same in the chamber.

5. For a picture or the like, a holder comprising: a frame formed with a chamber for holding a picture; a back member connected with said frame and forming part of said chamber; and a resilient flap connected to the back member and movable to provide a closure means for the chamber, the flap, when in position to close said chamber and the chamber is empty, having a portion extending into the chamber.

References Cited in the file of this patent
UNITED STATES PATENTS

| | | |
|---|---|---|
| 522,484 | Odgers | July 3, 1894 |
| 1,104,219 | Polverino | July 21, 1914 |
| 1,178,262 | Powell | Apr. 4, 1916 |
| 2,092,348 | Cross | Sept. 7, 1937 |